150 Å GOLD SUBSTRATE, 1000 Å PERMALLOY FILM

OO Å GOLD SUBSTRATE, 3.5 KV SPUTTERING VOLTAGE

130 Å GOLD SUBSTRATE, 2.2 KV SPUTTERING VOLTAGE

INVENTOR:
IRVING W. WOLF,

BY Dudley S. Ready
HIS AGENT.

INVENTOR:
IRVING W. WOLF,
BY Dudley J. Heady
HIS AGENT.

United States Patent Office 3,234,525
Patented Feb. 8, 1966

3,234,525

THIN FILM DEVICES

Irving W. Wolf, Liverpool, N.Y., assignor to General Electric Company, a corporation of New York Filed Mar. 28, 1960, Ser. No. 18,171
7 Claims. (Cl. 340—174)

This invention relates to a method of forming very thin films with optimized magnetic properties. In particular, permalloy type nickel-iron films having a thickness on the order of a few hundred angstroms and which have an anisotropic axis with a square loop hysteresis characteristic are formed. These films have utility as memory elements, parametric devices, etc. An example of a suitable application of these films is described in the Journal of Applied Physics, Supplement to Volume 30, No. 4, April 1959, pp. 60S and 61S ("Operating Characteristics of a Thin Film Memory") by J. I. Raffel.

The formation of thin films of permalloy type alloys having a composition of nickel and iron in the typical proportions of 4:1 (with or without additives), has been attained through several processes including vapor deposition and electrodeposition. By the application of a magnetic field during deposition, the films are produced with an "easy" axis of magnetization, i.e., an anisotropic axis in the plane of the film along which the relation of magnetic induction, B, to magnetic intensity, H, provides a square loop hysteresis characteristic. Good characteristic for thin film memory applications include a loop which among other characteristics has a relatively high coercive force, $H_C$, and preferably a high value of magnetic induction at saturation. It is essential for satisfactory films to have a high value of $H_{CD}$. This latter parameter is a measure of the magnetic intensity at which changes in flux can first be observed, as the magnetic intensity is increased. That is, it is desirable for the films not only to have a high retentivity, but also to retain their magnetism for drives as close to $H_C$ as possible. Therefore, by good squareness is meant relatively high values for flux and a high ratio of $H_{CD}$ to $H_C$. The axis perpendicular to the easy axis (also in the plane of the film) is defined as the "hard" axis of magnetization along which the hysteresis loop has substantially no opening for low values of H. That is, the relation of B to H traces substantially identical paths upon increasing or decreasing the field and the retentivity is substantially zero. It is also desirable to have low values of $H_K$, that is high permeability in the hard direction as explained more fully below. In the past it has proved difficult to obtain films with both the desired square loop along one axis and narrow loop characteristics along the other axis, with good reproducibility. Of the known methods as applied in the past, electrodeposition appeared to show some promise of reducing the scatter of performance data. Also, the squareness of the B–H loop was found to be improved by reducing the thickness of the film, but this resulted in a substantial reduction of the total magnetic flux, Φ, at saturation.

A serious apparent drawback of the early films was the fact that the hysteresigrams of samples driven in the hard direction showed openings at quite low drives for samples plated on about 1000 angstroms of sputtered gold. Replacing the gold with a copper-gold or copper sputtered electrode results in some improvement in this respect. However, there is a reduction of and variation in the squareness of the hysteresis loops in the easy direction, as compared with the gold substrate samples.

Accordingly, an object of this invention is to provide a new method for producing a thin magnetic film with an easy axis of high saturation flux and high retentivity and a hard axis of high permeability and zero retentivity.

More particularly, an object of this invention is to provide a new method for producing a permalloy type film surface with a thickness on the order of a few hundred angstroms having an easy axis of magnetization with a square hysteresis loop and high flux and having a hard axis of magnetization with a narrow hysteresis loop.

A further object of the invention is to provide a new method of producing an electrodeposited permalloy type film with a thickness in the range between approximately 100 angstroms and several thousand angstroms having an anisotropic axis of easy magnetization and a perpendicular axis of hard magnetization wherein the film is formed on a metallic substrate with a thickness between 100 and 250 angstroms in thickness.

A still further object of the invention is to provide a thin permalloy type film having an easy axis of magnetization with a square hysteresis loop characteristic and a hard axis of magnetization perpendicular thereto having a hysteresis loop with no opening for low values of magnetic intensity.

In accordance with one aspect of the disclosed invention, a method of preparing a thin permalloy type film with optimum magnetic properties is followed. A gold substrate is sputtered over a smooth surface on a base member to a thickness between 100 angstroms and 250 angstroms at a sputtering voltage between 1 kv. and 5 kv. A permalloy type film with a composition of nickel and iron in the approximate proportion of 4:1, with or without additives, is then electrodeposited over the substrate at a rate of approximately 3 ma./cm.$^2$ to a thickness between approximately 100 angstroms and several thousand angstroms. A magnetic field is applied parallel to the substrate during deposition resulting in a film having an anisotropic axis of easy magnetization with a square hysteresis loop in the direction of the field and having a perpendicular axis of hard magnetization with a hysteresis loop having no opening.

In accordance with another aspect of the disclosed invention, a novel, thin permalloy type film product is produced. The product is comprised of a smooth base piece upon which a noble element provides a substrate for a thin magnetic film uniformly deposited thereon to a thickness on the order of 1000 angstroms. The substrate has a uniformly smooth surface and a thickness of between 100 and 250 angstroms. The permalloy film electrodeposited thereon has an anisotropic axis of easy magnetization with a square hysteresis loop and a perpendicular axis of hard magnetization with a hysteresis loop having no opening.

The invention will be better understood from the following description taken in connection with the accompanying drawings and its scope will be pointed out in the appended claims.

Figure 1:
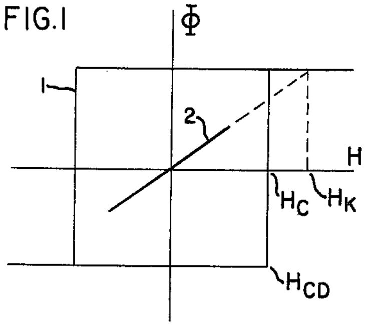
FIGURE 1 illustrates an idealized hysteresigram of a permalloy type film.

The method of producing a thin permalloy film in accordance with the disclosed invention requires two steps. First, a substrate is formed on a smooth base piece such as a fire-polished glass plate or a mylar film. This base piece provides the mechanical support for the final thin film product. The substrate performs the function of an electrode for the electrodeposition of the permalloy film. Since this film is only about one domain in thickness, the contours and the crystal formation of the surface of the substrate can be expected to be crucial to the film formation. This requirement suggests the use of a noble element such as gold or platinum which avoids contamination of the substrate surface before film deposition by reaction with the external atmosphere. Other classes of metals and alloys would be suitable in a vacuum or inert atmosphere. The process of applying the substrate is by sputtering with conventional apparatus, but it has been found that the operating controls and thickness are critical to a substrate formation which permits optimum electrodeposited film properties. Only with the proper sputtering voltages will a suitable substrate be formed. For too high a voltage, the sputtering gas ions will damage the substrate surface by breaking particles loose from the cathode. For too low a voltage, there is unsatisfactory adhesion of the substrate to the support piece. The maintenance of a very thin substrate has been found critical to consistent, optimum magnetic properties. These matters will be discussed at greater lengths below. The mechanism through which the thickness factor influences the magnetic properties of the film is incompletely understood, but it is hypothesized that a substrate tends to assume a dominant crystal lattice orientation for increasing thicknesses which improperly constrains the film formation.

Second, a permalloy film is carefully electrodeposited out of solution under the influence of a magnetic field. The rate of deposition must be sufficiently low so as to permit the proper formation of the domain structure. The magnetic field is applied parallel to the substrate surface to constrain the orientation of the permalloy lattice. A field strength above a threshold value of approximately 20 oersteds is sufficiently strong to orient the dipoles.

In permalloy films with a thickness from about one hundred to a few thousand angstroms, a magnetic structure is formed. The thin film may be considered as a layer approximately one domain in thickness. The range of usual thicknesses of the permalloy is from approximately one hundred to several thousand angstroms. One of the probable limitations of maximum thickness is believed to be set by the tendency of the film to form a multi-domain structure. In general, greater thickness tends to break down into multiple layered domains. Experience has shown that the foregoing practical limits are acceptable. When it is formed with an anisotropic axis of easy magnetization, the B-H curves have a shape in the nature of the idealized representation of FIGURE 1. Along the anisotropic axis, the magnetization curve is a square hysteresis loop of the form shown at 1. Along the axis perpendicular to the anisotropic axis, the B-H curve 2 for small magnetization is closed. The relation of the magnetic induction to the magnetic intensity is substantially linear and no opening appears.

FIGURE 1 also illustrates a plurality of points which provide convenient parameters for describing the magnetic properties of the film. $H_K$ is determined by the intersection of the 1 and 2 curves extrapolated and is defined as the point where saturation would occur along the hard axis. It is a measure of the permeability along the hard axis. Actually, a field intensity as high as $H_K$ is usually out of the linear range along the hard axis and an open loop characteristic would be introduced. The coercive force, $H_C$, is determined by the intersection of the 1 curve and the B=0 axis. This tends to reflect the squareness of the hysteresis loop. A more significant quantity is $H_{CD}$, which as previously defined is the point where changes in flux can be observed.

Figure 6:
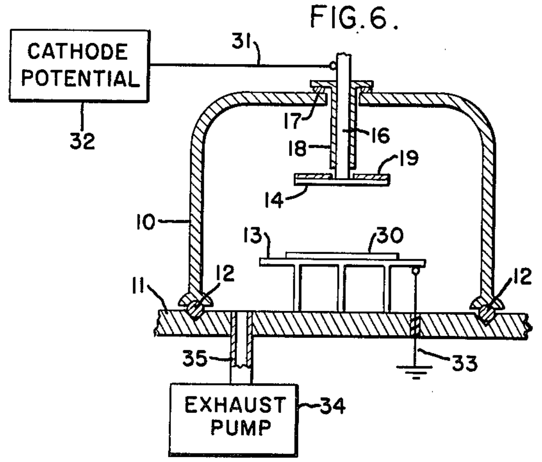
FIGURE 6 is a cross section in elevation of conventional sputtering apparatus used in part in practicing the disclosed invention.

The sputtering apparatus is of a conventional construction. As shown in FIGURE 6, a vacuum chamber is formed by a bell shaped glass jar 10 over a table surface 11. The chamber is sealed by a rubber ring element 12 which is interposed between a channel surface on the jar 10 and a like channel surface on the table 11. An aluminum tripod 13 is positioned on the table inside the jar to provide an anode member which supports the piece to be sputtered. A cathode is provided by a gold disk 14 approximately 10 mils thick and 5 square inches in area which is suspended about 2 inches over the tripod 13 by an aluminum rod 16. The rod provides an electrical connection to the cathode and is supported by and sealed to the jar 10 through a rubber seal ring 17 and a glass grommet 18. A glass plate 19 is positioned over the upper surface of the gold cathode to prevent sputtering from the upper surface of the gold. The piece to be sputtered is placed on the tripod 13 as shown at 30. The cathode is connected to a suitable source of cathode potential 32 by a lead 31 connected to the rod 16. The anode is connected to ground by lead 33. The chamber is connected to an exhaust pump 34 by a tube 35 which extends through the table 11.

In operation, the casing is first evacuated to a pressure of one micron of mercury to de-gas the apparatus. During sputtering, the casing is operated with an argon gas atmosphere which is maintained at a pressure of 15 to 20 microns of mercury. With the cathode at the operating potential, argon ions are formed and bombard the gold layer. Consequently, gold atoms are emitted from the cathode and travel to the anode where they form a substrate on the surface 30.

Figure 2A:
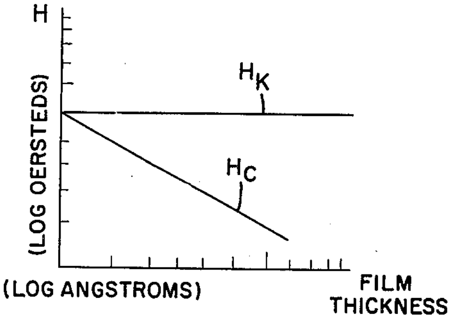
FIGURE 2A is a graphical representation of the values obtained for $H_C$ and $H_K$ plotted against film thicknesses for films with a substrate formed with 2.2 kv. sputtering voltage.
Figure 3A:
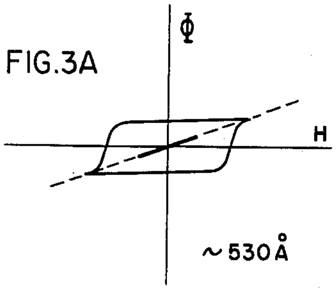
FIGURES 3A, 3B, 3C and 3D are representative hysteresigrams for different film thicknesses of these films.
Figure 4A:
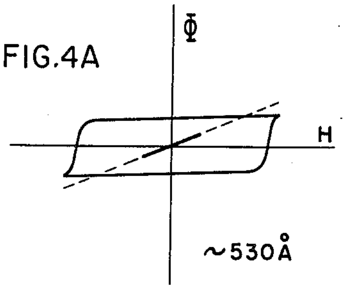
FIGURES 4A, 4B, 4C and 4D are representative hysteresigrams for different film thicknesses of these films.
Figure 3B:
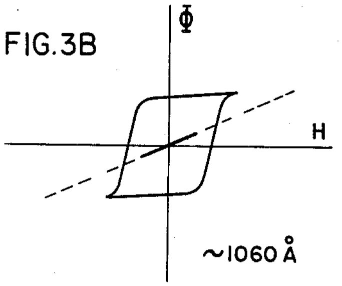
Figure 4B:
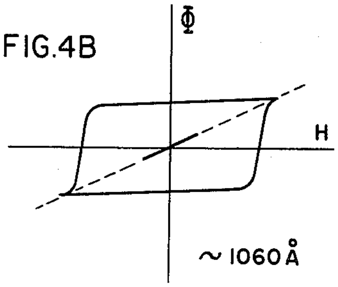
Figure 3C:
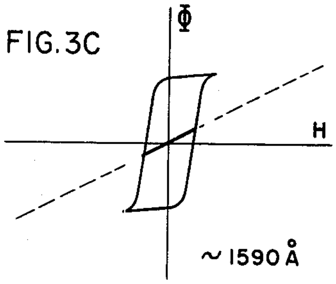
Figure 4C:
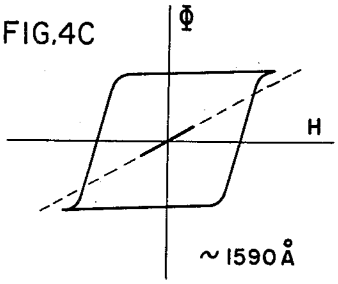
Figure 3D:
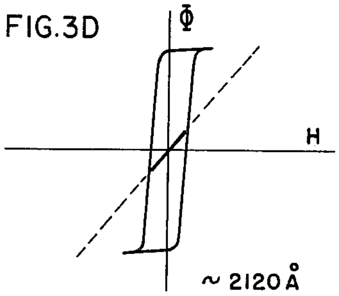
Figure 4D:
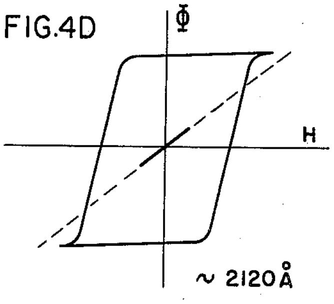

FIGURES 3A, 3B, 3C and 3D illustrate representative hysteresis loop characteristics of prior magnetic films on a very thin gold substarate (130 angstroms) with a typical sputtering voltage of 2.2 kv. As can be seen in FIGURE 3A a substantial ratio of $H_C$ to $H_K$ is obtained for a 530 angstrom film but with a thin hysteresis loop exhibiting a small flux change. As can be seen in FIGURES 3B, 3C and 3D, higher values of flux change can be obtained for increased film thicknesses but at the sacrifice of a progressively decreasing ratio of $H_C$ to $H_K$. The performance of films for increasing thickness is summarized in FIGURE 2A which is a plot of the relation between both $H_K$ and $H_C$ against film thickness. $H_K$ remains substantially constant and $H_C$ assumes rapidly decreasing values for increasing thickness.

Figure 2B:
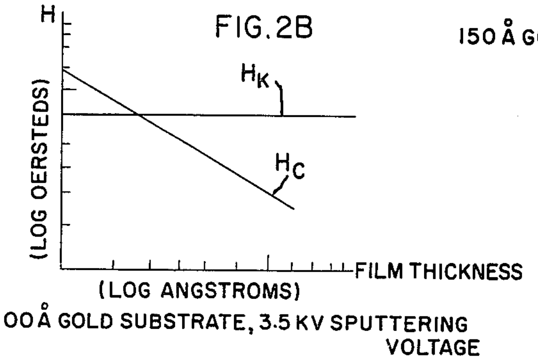
FIGURE 2B is a graphical representation of the values obtained for $H_C$ and $H_K$ plotted against film thicknesses for films with a substrate formed with a 3.5 kv. sputtering voltage.

With a thin gold substrate formed at a sputtering voltage of 3.5 kv. in accordance with the disclosed method, improved magnetic properties are obtained as illustrated by the representative hysteresigrams, FIGURES 4A, 4B, 4C and 4D. For a film thickness of 530 angstroms, substantially the same value of $H_K$ and an increased value of $H_C$ is obtained as compared with the film of FIGURE 3A. For increasing film thickness, FIGURES 4B, 4C and 4D, $H_K$ again remains substantially constant, but $H_C$ decreases at substantially the same rate as compared with 3B, 3C and 3D. It should be noted that the values of $H_{CD}$ are improved in a manner corresponding to the improvements in $H_C$. The performance of the films for increasing thickness is summarized in FIGURE 2B. A comparison of FIGURES 2A and 2B shows that the use of sputtering controls in accordance with the disclosed invention produces a substantially higher ratio of $H_C$ to $H_K$ and higher values of $H_{CD}$ as is particularly evidenced by the higher crossover point, that is, the film thickness where $H_C$ equals $H_K$.

The improvement in magnetic characteristics in respect to higher values of coercive force $H_C$, and disturbance level, $H_{CD}$, for a given film thickness, become increasingly important for smaller film areas. This is because of the inherent demagnetizing effect of small magnetic bodies. Therefore, to obtain reliable films with small areas it is essential to produce a high ratio of $H_{CD}$ to $H_K$.

Figure 5:
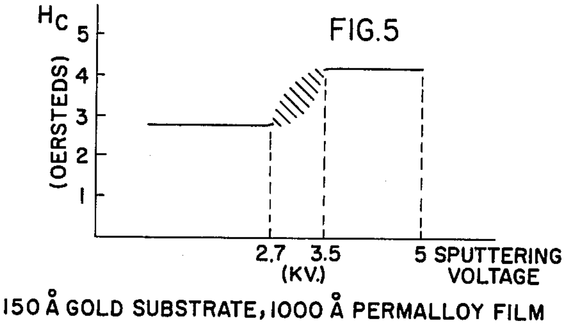
FIGURE 5 is a plot of $H_C$ against the sputtering voltage for a 150 angstrom gold substrate with a 1000 angstrom permalloy film electrodeposited thereon.

FIGURE 5 is a graphical representation of the relation between the sputtering voltage producing a 150 angstrom gold substrate and the resulting values of magnetic intensity, $H_C$, for a 1000 angstrom permalloy film electrodeposited thereon. The results indicate that for low voltages, up to 2.7 kv., only a low value of $H_C$, 2.8 oersted, is obtained and accordingly, a low value of $H_{CD}$. From 2.7 to 3.5 kv. there is a sharp increase in values of $H_C$ but the values are scattered as indicated by the shaded area. From 3.5 kv. to 5 kv., a consistent, high level of squareness ($H_C$ approximately 4.2 oersted for 1000 angstrom film) is obtained. Squareness is sharply lost for values over 5 kv. which produce scattered values $H_C$. The unsatisfactory results at high sputtering voltage appear to be adequately explained by a nonuniform surface resulting from gold particles which have been observed to be broken loose from the cathode. At low values of sputtering voltage, the poor films are caused by poor adhesion of the substrate to the base piece.

The substrate characteristics are not determined solely by the sputtering voltage, but of equal importance is the limitation of susbtrate thickness to a thin layer of gold on the order of a hundred, or a few hundred angstroms, in thickness for permalloy films about 1000 angstroms or less. It has been found that the substrate must be less than 800 angstroms to obtain a satisfactorily square hysteresis loop along the easy axis and for thicknesses between 500 and 800 angstroms, there is poor reproducibility for reasons set forth earlier. Also, openings begin to appear at lower drives in the hysteresis loop along the hard axis with a substrate over 150 angstroms in thickness. For these reasons, the substrate is formed with a thickness in the range of from about 100 to 250 angstroms. The lower limit of 100 angstroms is determined primarily by the difficulty in producing a continuous sufficiently conductive surface appropriate for electrodeposition.

The process for electrodeposition of the permalloy film is substantially in accordance with the disclosure in the 43rd Annual Technical Proceeds, 1956 American Electroplaters' Society, ("Nickel-Iron Alloy Electrodeposits for Magnetic Shielding" by I. W. Wolf and V. P. McConnell). A solution is formed with the following composition:

| | g./l. |
|---|---|
| Fe | 1.0 |
| $NiSO_4 6H_2O$ | 218.0 |
| NaCl | 9.7 |
| $H_3BO_3$ | 25.0 |
| Sodium lauryl sulfate | .42 |
| Saccharin | .83 |

The solution is maintained with a pH of 3.0 and a deposition rate of 3 ma./cm.$^2$ is maintained at the gold substrate (the cathode). A variation by a factor of four is permissible, but the high deposition rates must not be maintained for more than short periods. To produce an anisotropic axis of magnetization in the film it is necessary to provide a magnetic field along the chosen axis during electrodeposition. The field strength must be above the threshold value for the formation of the anisotropic axis. For this purpose, a coil or the equivalent is provided to produce a magnetic field with a strength greater than 20 oersteds in the vicinity of the gold substrate and with a direction parallel to the surface thereof.

At the present time, the most important area of application for films of the type produced in accordance with the disclosed invention lies in data processing equipment. In particular, elements of permalloy type film have been found exceptionally well suited to memory applications due to fast switching times (on the order of 0.1$\mu$ sec.), requiring compactness and low power consumption. Arrays of film discs can be formed by preforming the electrodes in accordance with the desired array or, preferably, forming strips of film and then photoetching to the desired pattern. Details of a suitable method are disclosed in the copending application of I. W. Wolf and O. G. White, "Method For Fabricating Small Elements of Thin Magnetic Film," Serial No. 19,782 filed April 4, 1960 and now U.S. Patent No. 3,081,210, filed concurrently. Input and output wiring may be provided by straight wires proximate and parallel to the disc surfaces in a manner such as that described in the Journal of Applied Physics article, cited above. The operation of the films is similar to that of conventional ferrite cores with the important exception that use is made of the anisotropic properties of the permalloy type films. Since the application of a field along the hard axis of magnetization lowers the field requirements for switching along the easy axis, this property is utilized in element selection. That is, the information and read pulses applied along the easy axis are produced with insufficient magnitude to switch the film elements. When a pulse is concurrently applied to a wire transverse to the input-output wires, switching will then occur and either a storing operation is performed or a binary digit read out in accordance with the flux change in an output wire.

While the fundamental novel features of the invention have been described as applied to a preferred embodiment, it is to be understood that the invention is not limited thereto. The true scope of the invention, including those variations apparent to one skilled in the art, is defined in the following claims.

What is claimed is:

1. A thin, permalloy type film element having an anisotropic axis of easy magnetization with a square hysteresis loop characteristic and a perpendicular axis of hard magnetization with a hysteresis loop having no opening for low drives said axes lying in the plane of the element comprising: a smooth base piece, a gold substrate thereon with a thickness between 100 and 250 angstroms; and a permalloy type film evenly distributed over the substrate with a thickness on the order of 1000 angstroms.

2. A thin, permalloy type film element having an anisotropic axis of easy magnetization with a square hysteresis loop characteristic and a perpendicular axis of hard magnetization with a hysteresis loop having no opening for low drives, said axes lying in the plane of the element comprising: a smooth base piece; a uniformly smooth substrate thereon composed of gold with a thickness between 100 and 250 angstroms; and an anisotropic permalloy type film evenly deposited over the substrate with a thickness between about 100 angstroms and several thousand angstroms.

3. A thin permalloy type film element having an anisotropic axis of easy magnetization with a square hysteresis loop characteristic and a perpendicular axis of hard magnetization with a hysteresis loop having no opening for low drives said axes lying in the plane of the element comprising: a smooth base piece; a sputtered gold substrate thereon with a thickness between 100 and 250 angstroms; and an electro-deposited permalloy type film evenly distributed over the substrate with a thickness on the order of 1000 angstroms.

4. A thin, permalloy type film element having an anisotropic axis of easy magnetization with a square hysteresis loop characteristic and a perpendicular axis of hard magnetization with a hysteresis loop having no opening for low drives said axes lying in the plane of the element comprising: a smooth base piece, a gold substrate sputtered thereon at a voltage between 3.5 kv. and 5 kv. with a thickness between 100 and 250 angstroms; and an electrodeposited permalloy type film evenly distributed over the substrate with a thickness on the order of 1000 angstroms.

5. A thin, permalloy type film element having an anisotropic axis of easy magnetization with a square hysteresis loop characteristic and a perpendicular axis of hard magnetization with a hysteresis loop having no opening for low drives said axes lying in the plane of the element comprising: a smooth base piece, a gold substrate which has been sputtered thereon at a voltage between 3.5 kv. and 5 kv. with a thickness between 100 and 250 angstroms; and a permalloy type film which has been evenly electrodeposited over the substrate in the presence of a magnetic field exceeding the threshold field value necessary to produce an anisotropic axis of magnetization, said film being electrodeposited to a thickness on the order of 1000 angstroms.

6. A thin, permalloy type film element having an anisotropic axis of easy magnetization with a square hysteresis loop characteristic and a perpendicular axis of hard magnetization with a hysteresis loop having no opening for low drives said axes lying in the plane of the element comprising: a smooth base piece, a platinum substrate thereon with a thickness between 100 and 250 angstroms; and a permalloy type film evenly distributed over the substrate with a thickness on the order of 1000 angstroms.

7. A thin, permalloy type film element having an anisotropic axis of easy magnetization with a square hysteresis loop characteristic and a perpendicular axis of hard magnetization with a hysteresis loop having no opening for low drives, said axes lying in the plane of the element comprising: a smooth base piece; a uniformly smooth substrate thereon composed of platinum with a thickness between 100 and 250 angstroms; and an anisotropic permalloy type film evenly deposited over the substrate with a thickness between about 100 angstroms and several thousand angstroms.

References Cited by the Examiner

UNITED STATES PATENTS

| | | | |
|---|---|---|---|
| 2,649,409 | 8/1953 | Von Hippel et al. | 204—38 |
| 2,792,563 | 5/1957 | Rajchman | 340—174 |
| 2,848,391 | 8/1958 | Fahnoe et al. | 204—38 |
| 2,900,282 | 8/1959 | Rubens | 340—174 |
| 2,945,217 | 7/1960 | Fisher et al. | 340—174 |
| 2,997,695 | 8/1961 | Conger | 340—174 |
| 3,019,125 | 1/1962 | Eggenberger et al. | 340—174 |
| 3,098,803 | 7/1963 | Godycki et al. | 340—174 |
| 3,124,490 | 3/1964 | Schmeckenbecher | 340—174 |

OTHER REFERENCES

Pages 45s and 46s, April 1959—Publication I—"Millimicrosecond Magnetic Switching and Storage Element," by David A. Meier; Journal of Applied Physics Supplement to vol. 30, No. 4.

IRVING L. SRAGOW, *Primary Examiner.*

JOSEPH REBOLD, JOHN F. BURNS, *Examiners.*

R. GOOCH, J. W. MOFFITT, *Assistant Examiners.*